(12) United States Patent
Weerawarna et al.

(10) Patent No.: US 7,591,891 B2
(45) Date of Patent: *Sep. 22, 2009

(54) FIBROUS BLEND AND METHODS OF PREPARATION

(75) Inventors: S. Ananda Weerawarna, Seattle, WA (US); Su Bing, Federal Way, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 214 days.

This patent is subject to a terminal disclaimer.

(21) Appl. No.: 11/768,064

(22) Filed: Jun. 25, 2007

(65) Prior Publication Data

US 2008/0319107 A1  Dec. 25, 2008

(51) Int. Cl.
*C08L 1/32* (2006.01)

(52) U.S. Cl. ............... 106/140.2; 106/144.3; 536/43; 536/52

(58) Field of Classification Search .............. 106/140.2, 106/144.3; 536/43, 52
See application file for complete search history.

(56) References Cited

U.S. PATENT DOCUMENTS

| | | | |
|---|---|---|---|
| 3,645,836 A | 2/1972 | Torr | |
| 4,028,290 A | 6/1977 | Reid | |
| 4,128,692 A | 12/1978 | Reid | |
| 4,143,163 A | 3/1979 | Hutchison et al. | |
| 4,273,118 A | 6/1981 | Smith | |
| 4,319,956 A | 3/1982 | Snyder et al. | |
| 4,605,401 A | 8/1986 | Chemilir et al. | |
| 4,624,868 A | 11/1986 | Muller | |
| 4,693,713 A | 9/1987 | Chmelir | |
| 4,952,550 A | 8/1990 | Wallach et al. | |
| 4,959,341 A | 9/1990 | Wallach | |
| 5,231,122 A | 7/1993 | Palumbo et al. | |
| 5,425,725 A | 6/1995 | Tanzer et al. | |
| 5,470,964 A | 11/1995 | Qin | |
| 5,498,705 A | 3/1996 | Qin | |
| 5,550,189 A | 8/1996 | Qin et al. | |
| 5,612,411 A | 3/1997 | Gross | |
| 5,688,776 A | 11/1997 | Bauer et al. | |
| 5,736,595 A | 4/1998 | Gunther et al. | |
| 5,801,116 A | 9/1998 | Cottrell et al. | |
| 5,847,031 A | 12/1998 | Klimmek et al. | |
| 6,162,541 A | 12/2000 | Chou et al. | |
| 6,296,936 B1 | 10/2001 | Yahiaoui et al. | |
| 6,331,619 B1 | 12/2001 | Besemer et al. | |
| 6,562,743 B1 | 5/2003 | Cook et al. | |
| 6,689,934 B2 | 2/2004 | Dodge, II et al. | |
| 6,713,460 B2 | 3/2004 | Huppe | |
| 6,765,042 B1 | 7/2004 | Thornton et al. | |
| 6,846,924 B1 | 1/2005 | Malmgren et al. | |
| 6,998,367 B2 | 2/2006 | Qin | |
| 7,306,039 B2 | 12/2007 | Wang et al. | |
| 7,321,007 B2 | 1/2008 | Gagliardi et al. | |
| 7,407,912 B2 | 8/2008 | Mertens et al. | |
| 2003/0027787 A1 | 2/2003 | Couture | |
| 2003/0068944 A1 | 4/2003 | Carlucci et al. | |
| 2003/0144642 A1 | 7/2003 | Dopps et al. | |
| 2003/0232965 A1 | 12/2003 | Bergeron | |
| 2004/0024092 A1 | 2/2004 | Soerens et al. | |
| 2004/0236260 A1 | 11/2004 | Griffiths et al. | |
| 2005/0214541 A1 | 9/2005 | Berrada et al. | |
| 2006/0142477 A1 | 6/2006 | Glasser | |
| 2006/0147689 A1 | 7/2006 | Wallajapet et al. | |
| 2007/0179291 A1 | 8/2007 | Thibodeau et al. | |
| 2008/0009616 A1 | 1/2008 | Frank et al. | |
| 2008/0078514 A1 | 4/2008 | Weerawarna et al. | |
| 2008/0078515 A1 * | 4/2008 | Weerawarna et al. | 162/9 |
| 2008/0079187 A1 * | 4/2008 | Weerawarna et al. | 264/109 |
| 2008/0079188 A1 | 4/2008 | Weerawarna et al. | |
| 2008/0081165 A1 * | 4/2008 | Weerawarna et al. | 428/221 |
| 2008/0081189 A1 | 4/2008 | Weerawarna et al. | |
| 2008/0081190 A1 | 4/2008 | Weerawarna et al. | |
| 2008/0081191 A1 | 4/2008 | Weerawarna et al. | |
| 2008/0081843 A1 | 4/2008 | Weerawarna et al. | |
| 2008/0082064 A1 | 4/2008 | Luo et al. | |
| 2008/0082065 A1 * | 4/2008 | Weerawarna et al. | 604/367 |
| 2008/0082067 A1 | 4/2008 | Weerawarna et al. | |
| 2008/0314537 A1 * | 12/2008 | Weerawarna et al. | 162/157.6 |
| 2008/0318772 A1 * | 12/2008 | Weerawarna et al. | 502/404 |
| 2008/0319108 A1 * | 12/2008 | Weerawarna et al. | 524/45 |

FOREIGN PATENT DOCUMENTS

| | | |
|---|---|---|
| WO | WO 00/21581 | 4/2000 |
| WO | WO 2005/123781 | 12/2005 |
| WO | WO 2006/079221 | 8/2006 |
| WO | WO 2006/119638 | 11/2006 |

\* cited by examiner

*Primary Examiner*—Peter Szekely
(74) *Attorney, Agent, or Firm*—John M Crawford (57) ABSTRACT

A method for making crosslinked fibers containing cellulose fibers in which an aqueous solution comprising a carboxyalkyl cellulose and a galactomannan polymer or a glucomannan polymer in water is treated with a first crosslinking agent to provide a gel; the gel mixed with a water-miscible solvent to provide mixed polymer fibers; cellulose fibers are added to the mixed polymer fibers; and these fibers are treated with a second crosslinking agent to provide crosslinked fibers.

19 Claims, 3 Drawing Sheets

FIBROUS BLEND AND METHODS OF PREPARATION

BACKGROUND OF THE INVENTION

Personal care absorbent products, such as infant diapers, adult incontinent pads, and feminine care products, typically contain an absorbent core that includes superabsorbent polymer particles distributed within a fibrous matrix. Superabsorbents are water-swellable, generally water-insoluble absorbent materials having a high absorbent capacity for body fluids. Superabsorbent polymers (SAPs) in common use are mostly derived from acrylic acid, which is itself derived from petroleum oil, a non-renewable raw material. Acrylic acid polymers and SAPs are generally recognized as not being biodegradable. Despite their wide use, some segments of the absorbent products market are concerned about the use of non-renewable petroleum oil derived materials and their non-biodegradable nature. Acrylic acid based polymers also comprise a meaningful portion of the cost structure of diapers and incontinent pads. Users of SAP are interested in lower cost SAPs. The high cost derives in part from the cost structure for the manufacture of acrylic acid which, in turn, depends upon the fluctuating price of petroleum oil. Also, when diapers are discarded after use they normally contain considerably less than their maximum or theoretical content of body fluids. In other words, in terms of their fluid holding capacity, they are "over-designed". This "over-design" constitutes an inefficiency in the use of SAP. The inefficiency results in part from the fact that SAPs are designed to have high gel strength (as demonstrated by high absorbency under load or AUL). The high gel strength (upon swelling) of currently used SAP particles helps them to retain a lot of void space between particles, which is helpful for rapid fluid uptake. However, this high "void volume" simultaneously results in there being a lot of interstitial (between particle) liquid in the product in the saturated state. When there is a lot of interstitial liquid the "rewet" value or "wet feeling" of an absorbent product is compromised.

In personal care absorbent products, U.S. southern pine fluff pulp is commonly used in conjunction with the SAP. This fluff is recognized worldwide as the preferred fiber for absorbent products. The preference is based on the fluff pulp's advantageous high fiber length (about 2.8 mm) and its relative ease of processing from a wetland pulp sheet to an airlaid web. Fluff pulp is also made from renewable and biodegradable cellulose pulp fibers. Compared to SAP, these fibers are inexpensive on a per mass basis, but tend to be more expensive on a per unit of liquid held basis. These fluff pulp fibers mostly absorb within the interstices between fibers. For this reason, a fibrous matrix readily releases acquired liquid on application of pressure. The tendency to release acquired liquid can result in significant skin wetness during use of an absorbent product that includes a core formed exclusively from cellulosic fibers. Such products also tend to leak acquired liquid because liquid is not effectively retained in such a fibrous absorbent core.

Superabsorbent produced in fiber form has a distinct advantage over particle forms in some applications. Such superabsorbent fiber can be made into a pad form without added non superabsorbent fiber. Such pads will also be less bulky due to elimination or reduction of the non superabsorbent fiber used. Liquid acquisition will be more uniform compared to a fiber pad with shifting superabsorbent particles.

One concern is that superabsorbent fibers may gel block. The fibers may swell and block wicking or transfer of liquid throughout the fiber pad.

A need therefore exists for a fibrous superabsorbent material that is simultaneously made from a biodegradable renewable resource like cellulose that is inexpensive. In this way, the superabsorbent material can be used in absorbent product designs that are efficient and do not gel block. These and other objectives are accomplished by the invention set forth below.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

The present invention provides methods for making the fibrous blend of mixed polymer fibers and cellulose fibers.

The mixed polymer fiber is a fiber comprising a carboxyalkyl cellulose, and a galactomannan polymer or a glucomannan polymer. The carboxyalkyl cellulose, which is mainly in the sodium salt form, can be in other salts forms such as potassium and ammonium forms. The mixed polymer fiber is formed by intermolecular crosslinking of mixed polymer molecules, and is water insoluble and water-swellable.

In one aspect, the present invention provides a mixed polymer fiber that is blended with cellulose fiber. As used herein, the term "mixed polymer fiber" refers to a fiber that is the formed of different polymers (i.e., mixed polymer). The mixed polymer fiber is a homogeneous composition that includes at least two associated water-soluble polymers: (1) a carboxyalkyl cellulose and (2) either a galactomannan polymer or a glucomannan polymer. The inclusion of cellulose with the mixed polymer fiber allows wicking of liquid and reduces gel blocking.

The carboxyalkyl cellulose useful in making the mixed polymer fiber has a degree of carboxyl group substitution (DS) of from about 0.3 to about 2.5. In one embodiment, the carboxyalkyl cellulose has a degree of carboxyl group substitution of from about 0.5 to about 1.5.

Although a variety of carboxyalkyl celluloses are suitable for use in making the mixed polymer fiber, in one embodiment, the carboxyalkyl cellulose is carboxymethyl cellulose. In another embodiment, the carboxyalkyl cellulose is carboxyethyl cellulose.

The carboxyalkyl cellulose is present in the mixed polymer fiber in an amount from about 60 to about 99% by weight based on the weight of the mixed polymer fiber. In one embodiment, the carboxyalkyl cellulose is present in an amount from about 80 to about 95% by weight based on the weight of the mixed polymer fiber. In addition to carboxyalkyl cellulose derived from wood pulp containing some carboxyalkyl hemicellulose, carboxyalkyl cellulose derived from non-wood pulp, such as cotton linters, is suitable for preparing the mixed polymer fiber. For carboxyalkyl cellulose derived from wood products, the mixed polymer fibers include carboxyalkyl hemicellulose in an amount up to about 20% by weight based on the weight of the mixed polymer fiber.

The galactomannan polymer useful in making the mixed polymer fiber can include any one of a variety of galactomannan polymers. In one embodiment, the galactomannan polymer is guar gum. In another embodiment, the galactomannan polymer is locust bean gum. In a further embodiment, the galactomannan polymer is tara gum.

The glucomannan polymer useful in making the mixed polymer fiber can include any one of a variety of glucomannan polymers. In one embodiment, the glucomannan polymer is konjac gum. In another embodiment, the galactomannan polymer is locust bean gum. In a further embodiment, the galactomannan polymer is tara gum.

The galactomannan polymer or glucomannan polymer is present in an amount from about 1 to about 20% by weight based on the weight of the mixed polymer fiber. In one embodiment, the galactomannan polymer or glucomannan polymer is present in an amount from about 1 to about 15% by weight based on the weight of the mixed polymer fiber.

The cellulose is present in an amount from about 2 to about 15% by weight based on the weight of the fibrous blend of mixed polymer fiber and cellulose fiber. In one embodiment, the cellulose is present in an amount from about 5 to about 10% by weight based on the weight of the fibrous blend of mixed polymer fiber and the cellulose fiber.

Although available from other sources, suitable cellulosic fibers are derived primarily from wood pulp. Suitable wood pulp fibers for use with the invention can be obtained from well-known chemical processes such as the kraft and sulfite processes, with or without subsequent bleaching. Pulp fibers can also be processed by thermomechanical, chemithermomechanical methods, or combinations thereof. A high alpha cellulose pulp is also a suitable wood pulp fiber. The preferred pulp fiber is produced by chemical methods. Ground wood fibers, recycled or secondary wood pulp fibers, and bleached and unbleached wood pulp fibers can be used. Softwoods and hardwoods can be used. Suitable fibers are commercially available from a number of companies, including Weyerhaeuser Company. For example, suitable cellulosic fibers produced from southern pine that are usable with the present invention are available from Weyerhaeuser Company under the designations CF416, NF405, FR516, and NB416. Other suitable fibers include northern softwood and eucalyptus fibers.

The preparation of the fibrous blend is a multistep process. First, the water-soluble carboxyalkyl cellulose and galactomannan polymer or glucomannan polymer are dissolved in water to provide a polymer solution. Then, a first crosslinking agent is added and mixed to obtain a mixed polymer gel formed by intermolecular crosslinking of water-soluble polymers.

Suitable first crosslinking agents include crosslinking agents that are reactive towards hydroxyl groups and carboxyl groups. Representative crosslinking agents include metallic crosslinking agents, such as aluminum (III) compounds, titanium (IV) compounds, bismuth (III) compounds, boron (III) compounds, and zirconium (IV) compounds. The numerals in parentheses in the preceding list of metallic crosslinking agents refers to the valency of the metal.

The mixed polymer fiber is generated by rapid mixing of the mixed polymer gel with a water-miscible solvent. This fiber generated after first crosslinking has a high level of sliminess when hydrated and forms soft gels. Therefore this fiber cannot be used in absorbent applications without further treatment.

In one embodiment cellulose fiber is then added to and mixed with the crosslinked mixed polymer fibers in solution and the combined fibers are filtered from the solution and dried In another embodiment cellulose fiber is then added to and mixed with the crosslinked mixed polymer fibers in the solution. The crosslinked mixed polymer fiber and cellulose fiber is further crosslinked (e.g., surface crosslinked) by treating with a second crosslinking agent in a water-miscible solvent containing water. The combined fibers are then filtered from the solution and dried. The composition of water-miscible solvent and water is such that the fiber does not change its fiber form and return to gel state. The second crosslinking agent can be the same as or different from the first crosslinking agent.

In another embodiment the crosslinked mixed polymer fiber is further crosslinked (e.g., surface crosslinked) by treating with a second crosslinking agent in a water-miscible solvent containing water. The cellulose fiber is added to and mixed with the crosslinked mixed polymer fibers in solution and the combined fibers are filtered from the solution and dried.

The mixed polymer fibers are substantially insoluble in water while being capable of absorbing water. The mixed polymer fibers are rendered water insoluble by virtue of a plurality of non-permanent intra-fiber metal crosslinks. As used herein, the term "non-permanent intra-fiber metal crosslinks" refers to the nature of the crosslinking that occurs within individual modified fibers (i.e., intra-fiber) and among and between each fiber's constituent polymer molecules.

The mixed polymer fibers are intra-fiber crosslinked with metal crosslinks. The metal crosslinks arise as a consequence of an associative interaction (e.g., bonding) between functional groups on the fiber's polymers (e.g., carboxy, carboxylate, or hydroxyl groups) and a multi-valent metal species. Suitable multi-valent metal species include metal ions having a valency of three or greater and that are capable of forming interpolymer associative interactions with the functional groups of the polymer (e.g., reactive toward associative interaction with the carboxy, carboxylate, or hydroxyl groups). A crosslink may be formed intramolecularly within a polymer molecule or may be formed intermolecularly between two or more polymer molecules within a fiber. The extent of intermolecular crosslinking affects the water solubility of the mixed polymer fibers (i.e., the greater the crosslinking, the greater the insolubility) and the ability of the fiber to swell on contact with an aqueous liquid.

The mixed polymer fibers include non-permanent intra-fiber metal crosslinks formed both intermolecularly and intramolecularly in the population of polymer molecules. As used herein, the term "non-permanent crosslink" refers to the metal crosslink formed with two or more functional groups of a polymer molecule (intramolecularly) or formed with two or more functional groups of two or more polymer molecules (intermolecularly). It will be appreciated that the process of dissociating and re-associating (breaking and reforming crosslinks) the multi-valent metal ion and polymer molecules is dynamic and also occurs during liquid acquisition. During water acquisition the individual fibers and fiber bundles swell and change to gel state. The ability of non permanent metal crosslinks to dissociate and associate under water acquisition imparts greater freedom to the gels to expand than if the gels were restrictively crosslinked by permanent crosslinks that do not have the ability to dissociate and re-associate. Covalent organic crosslinks, such as ether crosslinks, are permanent crosslinks that do not have the ability to dissociate and re-associate.

The fibers have fiber widths of from about 2 μm to about 50 μm (or greater) and coarseness that varies from soft to rough.

DETAILED DESCRIPTION OF THE DRAWINGS

Figure 1:
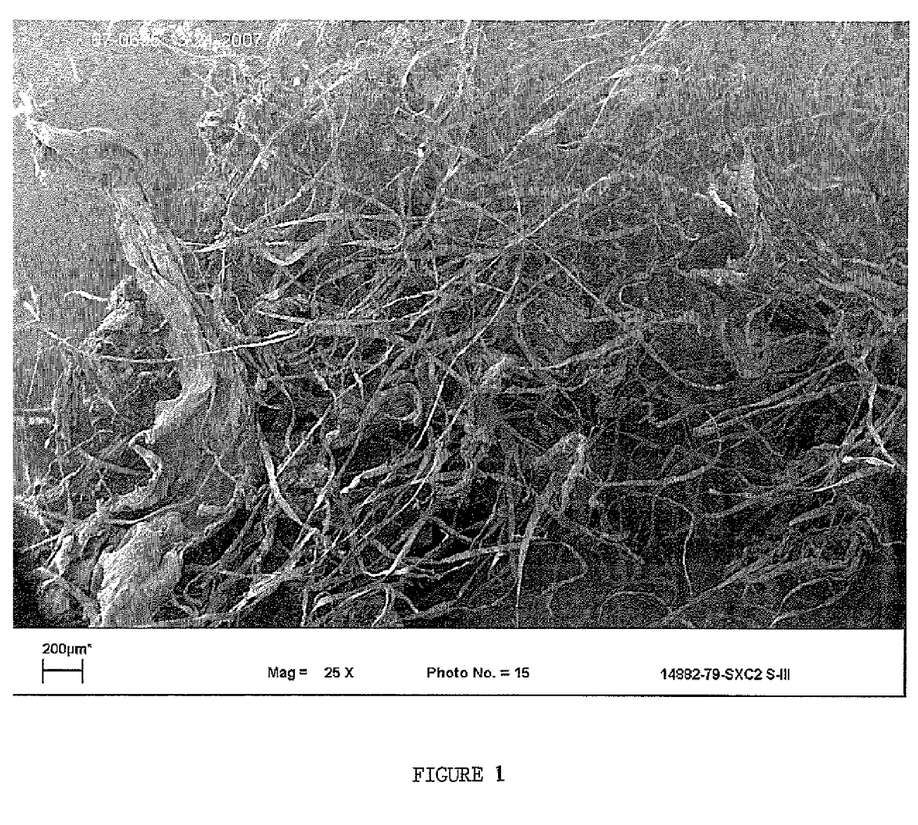
FIG. 1 is a scanning electron microscope photograph (25×) of representative blend of mixed polymer fibers and cellulose fibers.
Figure 2:
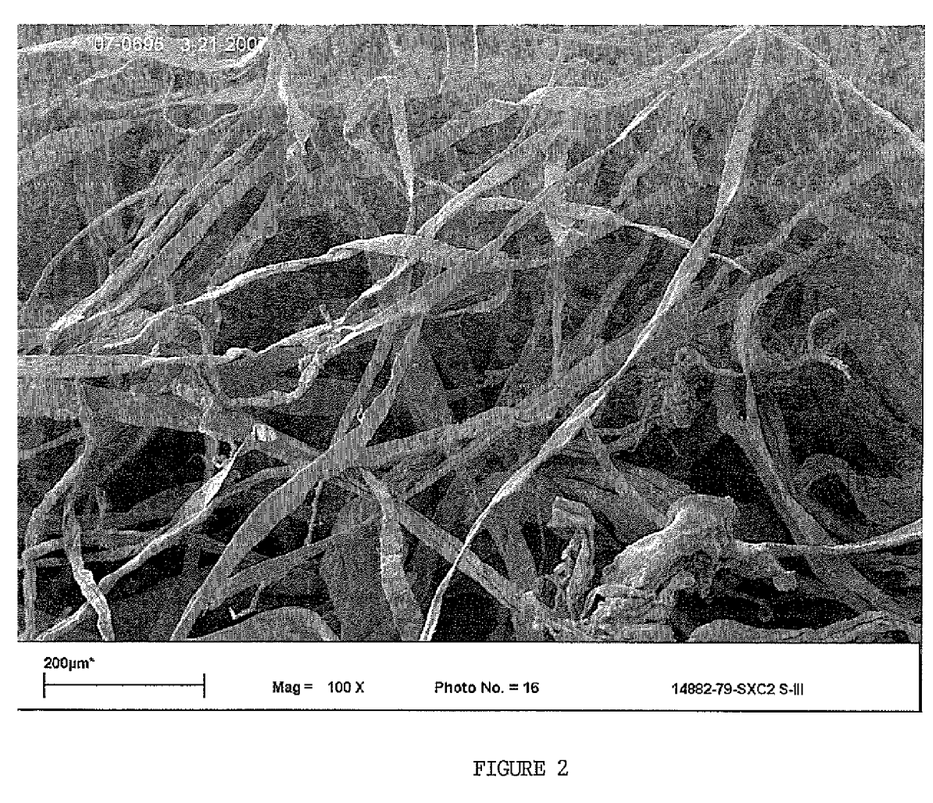
FIG. 2 is a scanning electron microscope photograph (100×) of representative blend of mixed polymer fibers and cellulose fibers.
Figure 3:
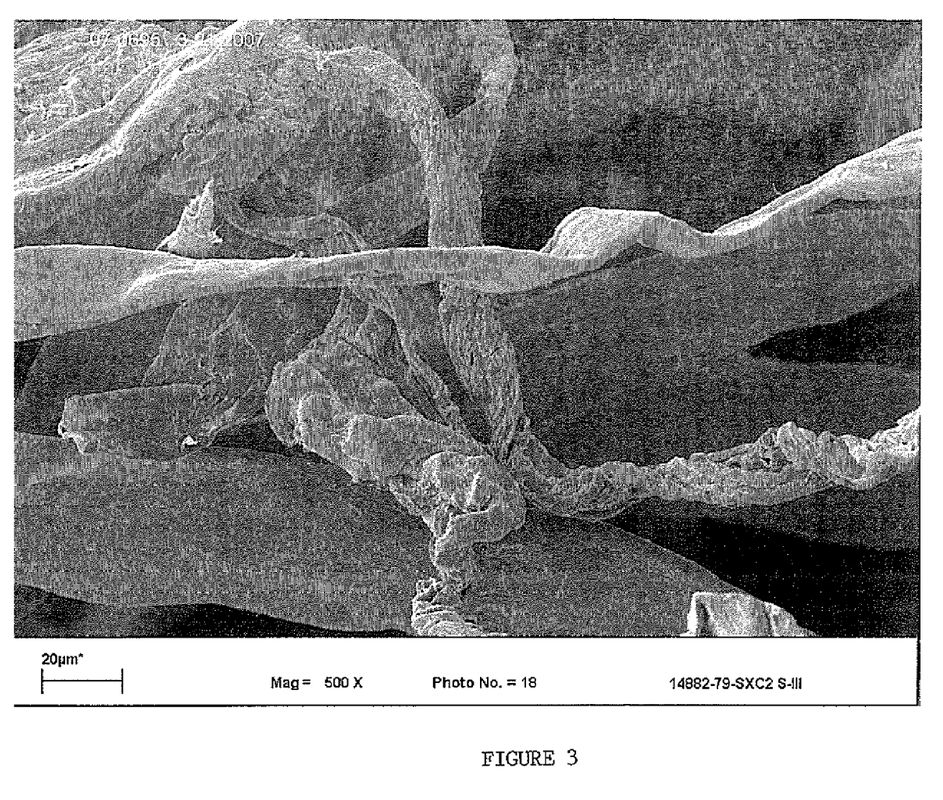
FIG. 3 is a scanning electron microscope photograph (500×) of representative blend of mixed polymer fibers and cellulose fibers.

Representative mixed polymer fibers are illustrated in FIGS. 1-3. FIG. 1 is a scanning electron microscope photograph (25×) of representative blend of mixed polymer fibers and cellulose fibers. FIG. 2 is a scanning electron microscope photograph (10×) of representative blend of mixed polymer fibers and cellulose fibers. FIG. 3 is a scanning electron microscope photograph (500×) of representative blend of mixed polymer fibers and cellulose fibers.

The fibrous blend of mixed polymer fibers and cellulose fibers is highly absorptive. The fibers have a Free Swell Capacity of from about 30 to about 60 g/g (0.9% saline solution), a Centrifuge Retention Capacity (CRC) of from about 15 to about 35 g/g (0.9% saline solution), and an Absorbency Under Load (AUL) of from about 15 to about 30 g/g (0.9% saline solution).

The fiber blend of mixed polymer fibers and cellulose fibers can be formed into pads by conventional methods including air-laying techniques to provide fibrous pads having a variety of liquid wicking characteristics. For example, pads absorb liquid at a rate of from about 10 mL/sec to about 0.005 mL/sec (0.9% saline solution/10 mL application). The integrity of the pads can be varied from soft to very strong.

The mixed polymer fibers of the fibrous blend are water insoluble and water swellable. Water insolubility is imparted to the mixed polymer fiber by intermolecular crosslinking of the mixed polymer molecules, and water swellability is imparted to the mixed polymer fiber by the presence of carboxylate anions with associated cations. The mixed polymer fibers are characterized as having a relatively high liquid absorbent capacity for water (e.g., pure water or aqueous solutions, such as salt solutions or biological solutions such as urine). Furthermore, because the mixed polymer fiber has the structure of a fiber, the mixed polymer fiber also possesses the ability to wick liquids. The mixed polymer fiber advantageously has dual properties of high liquid absorbent capacity and liquid wicking capacity which provides good fluid intake rates. The blend with cellulose fibers helps the wicking and reduces gel blocking. This also provides a way of blending the cellulose fibers with the mixed polymer fibers.

The fibrous blend of mixed polymer fibers and cellulose fibers having slow wicking ability of fluids are useful in medical applications, such as wound dressings and others. The fibrous blend of mixed polymer fibers and cellulose fibers having rapid wicking capacity for urine are useful in personal care absorbent product applications. The fibrous blend of mixed polymer fibers and cellulose fibers can be prepared having a range of wicking properties from slow to rapid for water and 0.9% aqueous saline solutions.

The fibrous blend of mixed polymer fibers and cellulose fibers are useful as superabsorbents in personal care absorbent products (e.g., infant diapers, feminine care products and adult incontinence products). Because of their ability to wick liquids and to absorb liquids, the fibrous blend of mixed polymer fibers and cellulose fibers are useful in a variety of other applications, including, for example, wound dressings, cable wrap, absorbent sheets or bags, and packaging materials.

In one aspect of the invention, methods for making the fibrous blend of mixed polymer fibers and cellulose fibers are provided.

In one embodiment, the method for making the fiber blend includes the steps of: (a) dissolving carboxyalkyl cellulose (e.g., mainly in salt form, with or without carboxyalkyl hemicellulose) and a galactomannan polymer or a glucomannan polymer in water to provide an aqueous polymer solution; (b) treating the aqueous solution with a first crosslinking agent to provide a gel; (c) mixing the gel with a water-miscible solvent to provide mixed polymer fibers; (d) dispersing cellulose fibers in the solvent containing mixed polymer fibers to provide a fiber dispersion; and filtering the fibers from the solvent and drying the fibers. The solvent is either alcohol alone or an alcohol and water mixture.

In another embodiment, the method for making the fiber blend includes the steps of: (a) dissolving carboxyalkyl cellulose (e.g., mainly in salt form, with or without carboxyalkyl hemicellulose) and a galactomannan polymer or a glucomannan polymer in water to provide an aqueous polymer solution; (b) treating the aqueous solution with a first crosslinking agent to provide a gel; (c) mixing the gel with a water-miscible solvent to provide mixed polymer fibers; (d) dispersing cellulose fibers in the solvent containing mixed polymer fibers to provide a fiber dispersion; and (e) treating the fibers with a second crosslinking agent to provide the fiber blend. The fiber blend so prepared can be fiberized and dried. The solvent is either alcohol alone or an alcohol and water mixture.

In this process, mixed polymer fiber comprising a carboxyalkyl cellulose and a galactomannan polymer or a glucomannan polymer, is blended in a solvent with cellulose fibers to provide a dispersion of cellulose with mixed polymer fibers; and these fibers are crosslinked. The solvent is either alcohol alone or an alcohol and water mixture.

In another embodiment, the method for making the fiber blend includes the steps of: (a) dissolving carboxyalkyl cellulose (e.g., mainly in salt form, with or without carboxyalkyl hemicellulose) and a galactomannan polymer or a glucomannan polymer in water to provide an aqueous polymer solution; (b) treating the aqueous solution with a first crosslinking agent to provide a gel; (c) mixing the gel with a water-miscible solvent to provide mixed polymer fibers; (d) treating the mixed polymer fibers with a second crosslinking agent; and (e) dispersing cellulose fibers in the solvent containing mixed polymer fibers to provide a fiber dispersion; and filtering the fibers from the solvent and drying the fibers. The solvent is either alcohol alone or an alcohol and water mixture.

Suitable carboxyalkyl celluloses have a degree of carboxyl group substitution of from about 0.3 to about 2.5, and in one embodiment have a degree of carboxyl group substitution of from about 0.5 to about 1.5. In one embodiment, the carboxyalkyl cellulose is carboxymethyl cellulose. The aqueous solution includes from about 60 to about 99% by weight carboxyalkyl cellulose based on the weight of the mixed polymer fiber. In one embodiment, the aqueous solution includes from about 80 to about 95% by weight carboxyalkyl cellulose based on the weight of mixed polymer fiber. Carboxyalkyl hemicellulose may also be present from about 0 to about 20 percent by weight based on the weight of mixed polymer fibers.

The aqueous solution also includes a galactomannan polymer or a glucomannan polymer. Suitable galactomannan polymers include guar gum, locust bean gum and tara gum. Suitable glucomannan polymers include konjac gum. The galactomannan polymer or glucomannan polymer can be from natural sources or obtained from genetically-modified plants. The aqueous solution includes from about 1 to about 20% by weight galactomannan polymer or glucomannan polymer based on the weight of the mixed polymer fiber, and in one embodiment, the aqueous solution includes from about 1 to about 15% by weight galactomannan polymer or glucomannan polymer based on the weight of mixed polymer fibers.

In the method, the aqueous solution including the carboxyalkyl cellulose and galactomannan polymer or glucomannan polymer is treated with a first crosslinking agent to provide a gel.

Suitable first crosslinking agents include crosslinking agents that are reactive towards hydroxyl groups and carboxyl groups. Representative crosslinking agents include metallic crosslinking agents, such as aluminum (III) compounds, titanium (IV) compounds, bismuth (III) compounds, boron (III) compounds, and zirconium (IV) compounds. The numerals in parentheses in the preceding list of metallic crosslinking agents refers to the valency of the metal.

Representative metallic crosslinking agents include aluminum sulfate; aluminum hydroxide; dihydroxy aluminum acetate (stabilized with boric acid); other aluminum salts of carboxylic acids and inorganic acids; other aluminum complexes, such as Ultrion 8186 from Nalco Company (aluminum chloride hydroxide); boric acid; sodium metaborate; ammonium zirconium carbonate; zirconium compounds containing inorganic ions or organic ions or neutral ligands; bismuth ammonium citrate; other bismuth salts of carboxylic acids and inorganic acids; titanium (IV) compounds, such as titanium (IV) bis(triethylaminato) bis(isopropoxide) (commercially available from the Dupont Company under the designation Tyzor TE); and other titanates with alkoxide or carboxylate ligands.

S The first crosslinking agent is effective for associating and crosslinking the carboxyalkyl cellulose (with or without carboxyalkyl hemicellulose) and galactomannan polymer molecules. The first crosslinking agent is applied in an amount of from about 0.1 to about 20% by weight based on the total weight of the mixed polymer fiber. The amount of first crosslinking agent applied to the polymers will vary depending on the crosslinking agent. In general, the fibers have an aluminum content of about 0.04 to about 0.8% by weight based on the weight of the mixed polymer fiber for aluminum crosslinked fibers, a titanium content of about 0.10 to about 1.5% by weight based on the weight of the mixed polymer fiber for aluminum crosslinked fibers, a zirconium content of about 0.09 to about 2.0% by weight based on the weight of the mixed polymer fiber for zirconium crosslinked fibers, and a bismuth content of about 0.90 to about 5.0% by weight based on the weight of the mixed polymer fiber for bismuth crosslinked fibers.

The gel formed by treating the aqueous solution of the carboxyalkyl cellulose and galactomannan polymer with a first crosslinking agent is then mixed with a water-miscible solvent to provide mixed polymer fibers. Suitable water-miscible solvents include water-miscible alcohols and ketones. Representative water-miscible solvents include acetone, methanol, ethanol, isopropanol, and mixtures thereof. In one embodiment, the water-miscible solvent is ethanol. In another embodiment, the water-miscible solvent is isopropanol.

The volume of water-miscible solvent added to the gel ranges from about 1:1 to about 1:5 water (the volume used in making the aqueous solution of carboxyalkyl cellulose, and galactomannan polymer) to water-miscible solvent.

In the method, mixing the gel with the water-miscible solvent includes stirring to provide mixed polymer fibers. The mixing step and the use of the water-miscible solvent controls the rate of dehydration and solvent exchange under shear mixing conditions and provides for mixed polymer fiber formation. Mixing can be carried out using a variety of devices including overhead stirrers, Hobart mixers, British disintegrators, and blenders. For these mixing devices, the blender provides the greatest shear and the overhead stirrer provides the least shear. As noted above, fiber formation results from shear mixing the gel with the water-miscible solvent and effects solvent exchange and generation of mixed polymer fiber in the resultant mixed solvent.

In one embodiment, mixing the gel with a water-miscible solvent to provide mixed polymer fibers comprises mixing a 1 or 2% solids in water with an overhead mixer or stirrer. In another embodiment, mixing the gel with a water-miscible solvent to provide mixed polymer fibers comprises mixing 4% solids in water with a blender. For large scale production alternative mixing equipment with suitable mixing capacities are used.

Cellulose fibers are added to the mixed polymer fiber dispersion in a water miscible solvent. The amount of cellulose fiber added is from about 2 to about 15% by weight cellulose fibers based on the weight of the fibrous blend of mixed polymer fiber and cellulose, and in one embodiment, the amount of cellulose fiber added is from about 5 to about 10% by weight cellulose fibers based on the weight of the fibrous blend of mixed polymer fibers and cellulose fibers. These cellulose fibers remain uncoated with the polymer.

In one embodiment the mixed polymer fiber is treated with a second crosslinking agent prior to adding the cellulose fiber. In another embodiment the fibrous blend of mixed polymer fiber and cellulose fiber is treated with a second crosslinking agent to provide the crosslinked mixed polymer fibers. The second crosslinking agent is effective in further crosslinking (e.g., surface crosslinking) the mixed polymer fibers. Suitable second crosslinking agents include crosslinking agents that are reactive towards hydroxyl groups and carboxyl groups. The second crosslinking agent can be the same as or different from the first crosslinking agent. Representative second crosslinking agents include the metallic crosslinking agents noted above useful as the first crosslinking agents.

The second crosslinking agent is applied at a relatively higher level than the first crosslinking agent per unit mass of fiber. This provides a higher degree of crosslinking on the surface of the fiber relative to the interior of the fiber. As described above, metal crosslinking agents form crosslinks between carboxylate anions and metal atoms or cellulose hydroxyl oxygen and metal atoms. These crosslinks can migrate from one oxygen atom to another when the mixed polymer fiber absorbs water and forms a gel. However, having a higher level of crosslinks on the surface of the fiber relative to the interior provides a superabsorbent fiber with a suitable balance in free swell, centrifuge retention capacity, absorbency under load for aqueous solutions and lowers the gel blocking that inhibits liquid transport.

The second crosslinking agent is applied in an amount from about 0.1 to about 20% by weight based on the total weight of mixed polymer fibers. The amount of second crosslinking agent applied to the polymers will vary depending on the crosslinking agent. The product fibers have an aluminum content of about 0.04 to about 2.0% by weight based on the weight of the mixed polymer fiber for aluminum crosslinked fibers, a titanium content of about 0.1 to about 4.5% by weight based on the weight of the mixed polymer fiber for titanium crosslinked fibers, a zirconium content of about 0.09 to about 6.0% by weight based on the weight of the mixed polymer fiber for zirconium crosslinked fibers, and a bismuth content of about 0.09 to about 5.0% by weight based on the weight of the mixed polymer fiber for bismuth crosslinked fibers.

The second crosslinking agent may be the same as or different from the first crosslinking agent. Mixtures of two or more crosslinking agents in different ratios may be used in each crosslinking step.

Test Methods

Free Swell and Centrifuge Retention Capacities

The materials, procedure, and calculations to determine free swell capacity (g/g) and centrifuge retention capacity (CRC) (g/g) were as follows.

Test Materials:

Japanese pre-made empty tea bags (available from Drugstore.com, IN PURSUIT OF TEA polyester tea bags 93 mm×70 mm with fold-over flap. (http:www.mesh.ne.jp/tokiwa/)).

Balance (4 decimal place accuracy, 0.0001 g for air-dried superabsorbent polymer (ADS SAP) and tea bag weights); timer; 1% saline; drip rack with clips (NLM 211); and lab centrifuge (NLM 211, Spin-X spin extractor, model 776S, 3,300 RPM, 120v).

Test Procedure:
1. Determine solids content of ADS.
2. Pre-weigh tea bags to nearest 0.0001 g and record.
3. Accurately weigh 0.2025g+/−0.0025 g of test material (SAP), record and place into pre-weighed tea bag (air-dried (AD) bag weight). (ADS weight+AD bag weight=total dry weight).
4. Fold tea bag edge over closing bag.
5. Fill a container (at least 3 inches deep) with at least 2 inches with 1% saline.
6. Hold tea bag (with test sample) flat and shake to distribute test material evenly through bag.
7. Lay tea bag onto surface of saline and start timer.
8. Soak bags for specified time (e.g., 30 minutes).
9. Remove tea bags carefully, being careful not to spill any contents from bags, hang from a clip on drip rack for 3 minutes.
10. Carefully remove each bag, weigh, and record (drip weight).
11. Place tea bags onto centrifuge walls, being careful not to let them touch and careful to balance evenly around wall.
12. Lock down lid and start timer. Spin for 75 seconds.
13. Unlock lid and remove bags. Weigh each bag and record weight (centrifuge weight).

Calculations:

The tea bag material has an absorbency determined as follows:

Free Swell Capacity, factor=5.78
Centrifuge Capacity, factor=0.50
Z=Oven dry SAP wt (g)/Air dry SAP wt (g)
Free Capacity (g/g):

$$\frac{[(\text{drip wt(g)} - \text{dry bag wt(g)}) - (ADSAP \text{ wt(g)})]}{(ADSAP \text{ wt(g)} * Z)} - (\text{dry bag wt(g)} * 5.78)$$

Centrifuge Retention Capacity (g/g):

$$\frac{[\text{centrifuge wt(g)} - \text{dry bag wt(g)} - (ADSAP \text{ wt(g)})]}{(ADSAP \text{ wt} * Z)} - (\text{dry bag wt(g)} * 0.50)$$

Absorbency Under Load (AUL)

The materials, procedure, and calculations to determine AUL were as follows.

Test Materials:

Mettler Toledo PB 3002 balance and BALANCE-LINK software or other compatible balance and software. Software set-up: record weight from balance every 30 sec (this will be a negative number. Software can place each value into EXCEL spreadsheet.

Kontes 90 mm ULTRA-WARE filter set up with fritted glass (coarse) filter plate. clamped to stand; 2 L glass bottle with outlet tube near bottom of bottle; rubber stopper with glass tube through the stopper that fits the bottle (air inlet); TYGON tubing; stainless steel rod/plexiglass plunger assembly (71 mm diameter); stainless steel weight with hole drill through to place over plunger (plunger and weight=867 g); VWR 9.0 cm filter papers (Qualitative 413 catalog number 28310-048) cut down to 80 mm size; double-stick SCOTCH tape; and 0.9% saline.

Test Procedure:
1. Level filter set-up with small level.
2. Adjust filter height or fluid level in bottle so that fritted glass filter and saline level in bottle are at same height.
3. Make sure that there are no kinks in tubing or air bubbles in tubing or under fritted glass filter plate.
4. Place filter paper into filter and place stainless steel weight onto filter paper.
5. Wait for 5-10 min while filter paper becomes fully wetted and reaches equilibrium with applied weight.
6. Zero balance.
7. While waiting for filter paper to reach equilibrium prepare plunger with double stick tape on bottom.
8. Place plunger (with tape) onto separate scale and zero scale.
9. Place plunger into dry test material so that a monolayer of material is stuck to the bottom by the double stick tape.
10. Weigh the plunger and test material on zeroed scale and record weight of dry test material (dry material weight 0.15 g+/−0.05 g).
11. Filter paper should be at equilibrium by now, zero scale.
12. Start balance recording software.
13. Remove weight and place plunger and test material into filter assembly.
14. Place weight onto plunger assembly.
15. Wait for test to complete (30 or 60 min)
16. Stop balance recording software.

Calculations:

A=balance reading (g)*−1 (weight of saline absorbed by test material)
B=dry weight of test material (this can be corrected for moisture by multiplying the AD weight by solids %).

AUL (g/g)=A/B (g 1% saline/1 g test material)

The following examples are provided for the purpose of illustrating, not limiting, the invention.

The following example illustrates a general method for manufacturing carboxymethyl cellulose from wood pulp.

Lightly bleached kraft pulp (25.0 g, oven dried) was mixed with isopropanol (1.39 L) under nitrogen environment at 0° C. or 30 min. A sodium hydroxide solution (20.28 g in water with a total weight of 135.3 g) was added dropwise over 30 minutes and the reaction was left to stir for 1 h. A solution of monochloroacetic acid (22.69 g) in isopropanol (55.55 mL) was added dropwise to the stirring pulp over 30 min while the reaction temperature was increased to 55° C. The reaction was stirred for 3 h and then filtered, placed in 2 L 70/30 methanol/water solution, and neutralized with acetic acid. The resulting slurry was collected by filtration, washed one time each with 2 L 70/30, 80/20, and 90/10 ethanol/water solutions, and then finally with 100% methanol to provide the product carboxymethyl cellulose.

The following example illustrates a general method for manufacturing the mixed polymer fiber. It is the method for manufacturing the mixed polymer fiber of example 8.

A solution of wood pulp carboxymethyl cellulose of DS=0.67, (20.0 g OD) in 450 ml deionized (DI) water was prepared with vigorous stirring to obtain a solution. Guar gum (1.2 g) was added and mixed well to obtain a homogeneous solution.

Then 0.4 g aluminum sulfate octadecahydrate dissolved in 50 ml DI water was added to the polymer solution, and blend for 30 minutes to obtain a homogeneously crosslinked polymer gel. The gel was then transferred into a Waring type blender with 500 ml of iso propanol and blend for one minute at low power. Then one liter of iso propanol was added and blended for one minute at low speed. Then filter and place the fiber in 500 ml of iso propanol and stirred for 30 minutes. Filter the fiber and dry in an oven at 65° C. for 30 minutes.

Dissolve 0.30 g of aluminum sulfate octadecahydrate in 125 ml of deionized water and mix with 375 ml of iso propanol. To the stirred solution add 6.0 g of fiber, prepared as described above, and leave for 15 minutes. Filter the fiber and soak in 250 ml of iso propanol for 15 minutes. Filter and dry the product fiber at 65° C. for 15 minutes. Disperse 0.37 g fluff pulp (cellulose fiber) 400 ml of iso propanol. To the stirred solution add 3.7 g of precipitated fiber, prepared as described above, and leave for 5 minutes. Filter the fiber mixture and dry in an oven at 65° C. for 15 minutes. Free swell (49.6 g/g), centrifuge retention capacity (29.36 g/g), for 0.9% saline solution.

The absorbent properties of the representative mixed polymer fibers with cellulose are summarized in the tables. In the tables, the amount of first crosslinking agent applied is expressed as the weight % applied to the total weight of CMC and guar gum; "Second crosslinking agent/2 g" refers to the amount of second crosslinking agent applied per 2 g first crosslinked product; "DS" refers to the degree of carboxyl group substitution; "CMC 9H4F" refers to a carboxymethyl cellulose commercially available from Hoechst Celanese under that designation; "KL-SW" refers to CMC made from northern softwood pulp; "Lv-Pn" refers to CMC made from west coast pine pulp; "Lv-Fr" refers to CMC made from west coast fir pulp; "NB" refers to CMC made from southern pine pulp fibers; and "PA Fluff" refers northern softwood pulp fibers; "i-PrOH" refers to isopropanol; "EtOH" refers to ethanol; "w wash" refers to washing the treated fibers with 100% ethanol or 100% isopropanol before drying; and "wo washing" refers to the process in which the treated fibers are not washed before drying.

TABLE 1

Composition of mixed polymer fiber before the addition of cellulose fiber

| Ex. | CMC | CMC amount | DS | Guar gum | $1^{st}$ crosslinking agent | $2^{nd}$ crosslinking agent/2 g |
|---|---|---|---|---|---|---|
| 1 | CMC 9H4F | 94.6% | — | 5.4% | $AL_2(SO_4)_3$ 1.83% $B(OH)_3$ 0.9% | $AL_2(SO_4)_3$ 0.13 g |
| 2 |  | 94.5% | 0.78 | 5.5% | $AL_2(SO_4)_3$ 1.85% | $AL_2(SO_4)_3$ 0.14 g |
| 3 | Lv | 94.5% | 1.02 | 5.5% | $AL_2(SO_4)_3$ 1.85% | $AL_2(SO_4)_3$ 0.15 g |
| 4 | NB | 94.5% | 0.98 | 5.5 | $AL_2(SO_4)_3$ 1.85% | $AL_2(SO_4)_3$ 0.15 g |
| 5 | Lv HW | 94.5% | 1.01 | 5.5% | $AL_2(SO_4)_3$ 1.85% | $AL_2(SO_4)_3$ 0.15 g |
| 6 | Lv Pn | 94.5% | 0.98 | 5.5 | $AL_2(SO_4)_3$ 1.85% | $AL_2(SO_4)_3$ 0.16 g |
| 7 | Lv Fr | 94.5% | 0.93 | 5.5 | $AL_2(SO_4)_3$ 1.85% | $AL_2(SO_4)_3$ 0.16 g |
| 8 | Lv Pn | 94.4% | 0.67 | 5.6 | $AL_2(SO_4)_3$ 0.93% | $AL_2(SO_4)_3$ 0.06 g, 1% C., 15 min. |
| 9 | Lv Pn | 94.4% | 0.67 | 5.6 | $AL_2(SO_4)_3$ 1.85% | $AL_2(SO_4)_3$ 0.06 g, 0.5% C., 5 min |

The final composition of examples 1 to 9 in table 2 are obtained by mixing cellulose fiber with the mixed polymer fiber compositions of examples 1 to 9, respectively, of table 1.

TABLE 2

Addition of cellulose to the mixed polymer fiber composition 1 to 9 of table 1 (with or without further crosslinking) and absorbent capacities of final mixed fiber composition

| Ex. | Mixed Polymer fibers | Cellulose Pulp fibers | crosslinking agent/2 g | Free swell g/g | CRC g/g | AUL g/g |
|---|---|---|---|---|---|---|
| 1 | 91% | 9% | None | 47.63 | 26.65 | 27.31 |
| 2 | 90% | 10% | None | 56.1 | 20.65 |  |
| 3 | 83.4% | 16.6% | $AL_2(SO_4)_3$ 0.005 g | 35.53 | 15.61 |  |
| 4 | 87% | 13% | None | 37.7 | 17.96 |  |
| 5 | 80% | 20% | None | 34.54 | 12.99 |  |
| 6-1 | 91% | 9% | None | 31.18 | 9.98 |  |
| 6-2 | 91% | 9% | None | 41.91 | 10.97 |  |
| 6-3 | 80% | 20% | None | 39.01 | 10.1 |  |
| 7 | 90% | 10% | $AL_2(SO_4)_3$ 0.045 g | 37.73 | 12.65 |  |
| 8 | 91% | 9% | None | 49.6 | 29.36 |  |
| 9 | 91% | 9% | None | 45.85 | 27.64 |  |

While illustrative embodiments have been illustrated and described, it will be appreciated that various changes can be made therein without departing from the spirit and scope of the invention.

The invention claimed is:
1. A method for making crosslinked fibers, comprising:
 (a) providing an aqueous solution comprising a carboxyalkyl cellulose and a galactomannan polymer or a glucomannan polymer in water to provide an aqueous polymer solution;
 (b) treating the aqueous dispersion with a first crosslinking agent to provide a gel;
 (c) mixing the gel with a water-miscible solvent to provide mixed polymer fibers;
 (d) adding cellulose wood pulp fibers to the mixed polymer fibers.
2. The method of claim 1, wherein the carboxyalkyl cellulose is carboxymethyl cellulose.

3. The method of claim 1, wherein the galactomannan polymer is selected from the group consisting of guar gum, locust bean gum, and tara gum.

4. The method of claim 1, wherein the glucomannan polymer is konjac gum.

5. The method of claim 1, wherein the aqueous solution comprises from about 60 to about 99 percent by weight carboxyalkyl cellulose based on the total weight of crosslinked fibers.

6. The method of claim 1, wherein the aqueous solution comprises from about 1 to about 20 percent by weight galactomannan polymer or glucomannan polymer based on the total weight of crosslinked fibers.

7. The method of claim 1, wherein the crosslinked fibers comprises from about 2 to about 15 percent by weight cellulose fibers based on the total weight of crosslinked fibers.

8. The method of claim 1, wherein the first crosslinking agent is a crosslinking agent reactive to carboxyl groups or hydroxyl groups.

9. The method of claim 1, wherein the first crosslinking agent is selected from the group consisting of aluminum (III) compounds, titanium (IV) compounds, bismuth (III) compounds, boron (III) compounds, and zirconium (IV) compounds.

10. The method of claim 1, wherein the first crosslinking agent is present in an amount from about 0.1 to about 20 percent by weight based on the total weight of crosslinked fibers.

11. The method of claim 1, wherein the water-miscible solvent is an alcohol.

12. The method of claim 1, wherein the water-miscible solvent is selected from the group consisting of methanol, ethanol, isopropanol, and mixtures thereof.

13. The method of claim 1, wherein the volume of water-miscible solvent to water is from about 1:1 to about 1:5.

14. The method of claim 1, wherein mixing the gel with the water-miscible solvent comprises stirring to provide fibers.

15. The method of claim 1 further comprising treating the fibers with a second crosslinking agent to provide crosslinked mixed polymer fibers.

16. The method of claim 15 wherein the second crosslinking agent is added prior to adding the cellulose fibers.

17. The method of claim 15 wherein the second crosslinking agent is added after adding the cellulose fibers.

18. The method of claim 1, wherein the second crosslinking agent is selected from the group consisting of aluminum (III) compounds, titanium (IV) compounds, bismuth (III) compounds, boron (III) compounds, and zirconium (IV) compounds.

19. The method of claim 1, wherein the second crosslinking agent is present in an amount from about 0.1 to about 20 percent by weight based on the total weight of crosslinked fibers.

* * * * *

UNITED STATES PATENT AND TRADEMARK OFFICE
CERTIFICATE OF CORRECTION

| | | |
|---|---|---|
| PATENT NO. | : 7,591,891 B2 | Page 1 of 1 |
| APPLICATION NO. | : 11/768064 | |
| DATED | : September 22, 2009 | |
| INVENTOR(S) | : Weerawarna et al. | |

It is certified that error appears in the above-identified patent and that said Letters Patent is hereby corrected as shown below:

Column 14, Line 16, Claim 17: "cellulose fibers" should read -- cellulose wood pulp fibers --

Signed and Sealed this

Tenth Day of November, 2009

David J. Kappos
*Director of the United States Patent and Trademark Office*